(12) United States Patent
Murakami et al.

(10) Patent No.: US 8,881,512 B2
(45) Date of Patent: Nov. 11, 2014

(54) CATALYST CONVERTER DEVICE FOR PURIFYING EXHAUST GAS AND SADDLE-RIDE TYPE VEHICLE

(71) Applicant: Honda Motor Co., Ltd., Tokyo (JP)

(72) Inventors: Atsushi Murakami, Wako (JP); Kensuke Honma, Waiko (JP); Kazuhisa Maeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 13/799,211

(22) Filed: Mar. 13, 2013

(65) Prior Publication Data

US 2013/0255238 A1     Oct. 3, 2013

(30) Foreign Application Priority Data

Mar. 27, 2012   (JP) ................. 2012-070673

(51) Int. Cl.
*F01N 3/10*     (2006.01)
*F01N 3/28*     (2006.01)
*B01D 53/94*    (2006.01)

(52) U.S. Cl.
CPC ............. *F01N 3/2842* (2013.01); *B01D 53/94* (2013.01); *F01N 2590/04* (2013.01); *B01D 53/9454* (2013.01); *F01N 2450/02* (2013.01); *F01N 3/2885* (2013.01)
USPC .............. 60/299; 422/179; 422/177; 422/180

(58) Field of Classification Search
CPC . F01N 3/2842; F01N 3/2885; F01N 2590/04; F01N 2450/02; B01D 53/94
USPC ..................................... 60/272–324
See application file for complete search history.

(56) References Cited

U.S. PATENT DOCUMENTS 6,824,744 B1 * 11/2004 Stoepler et al. ............... 422/179
7,078,086 B2 * 7/2006 Hijikata ....................... 428/116

FOREIGN PATENT DOCUMENTS

JP     9-317455 A     12/1997
JP     2004-204819 A     7/2004

* cited by examiner

*Primary Examiner* — Jesse Bogue
(74) *Attorney, Agent, or Firm* — Birch, Stewart, Kolasch & Birch, LLP

(57) ABSTRACT

A catalyst converter having a retaining mat with a thickness wherein the apparent density during assembling becomes 0.25 g/cm³ or more and less than 0.51 g/cm³ and the outside diameter D1 of a catalyst retainer is set according to interference of the retaining mat in passing through a press-in tool and interference of the retaining mat after being pressed into a retaining tube. The retaining mat is formed of a non-expandable inorganic fiber sheet. A pressing force moves the catalyst retainer in the axial direction with respect to the retaining tube while the catalyst converter device is used with the length L2 along the longitudinal direction of the catalyst retainer in the retaining mat wound around the catalyst retainer being set longer than the winding diameter D1 of the retaining mat around the catalyst retainer so that a retaining force R greater than the pressing force F can be secured.

20 Claims, 8 Drawing Sheets

CATALYST CONVERTER DEVICE FOR PURIFYING EXHAUST GAS AND SADDLE-RIDE TYPE VEHICLE

CROSS-REFERENCE TO RELATED APPLICATIONS

The present application claims priority under 35 USC 119 to Japanese Patent Application No. 2012-070673 filed Mar. 27, 2012 the entire contents of which are hereby incorporated by reference.

BACKGROUND OF THE INVENTION

1. Field of the Invention

The present invention relates to a catalyst converter device for purifying exhaust gas in which a catalyst retainer obtained by a catalyst is carried by a carrier and retained inside a metal tubular member through a retaining mat. A saddle-ride type vehicle includes the catalyst converter device for purifying exhaust gas.

2. Description of Background Art

In an exhaust system of an engine, a catalyst converter device is provided that includes a catalyst that purifies hydrocarbon, carbon monoxide and nitrogen oxide included in exhaust gas.

As such a catalyst converter device, there is one wherein a catalyst retainer obtained by a catalyst is carried by a carrier and retained through a retaining mat inside a metal tubular member provided in an exhaust pipe or a muffler. In addition, the catalyst retainer is retained by interference of the retaining mat inserted between the catalyst retainer and the metal tubular member.

A retaining mat is known that is included in the catalyst converter device and is formed of two layers of an alumina fiber layer and a ceramic fiber layer. See, for example, JP-A No. 2004-204819. A method is known for assembling a catalyst converter device by winding a retaining mat around a catalyst retainer using an organic sheet and thereafter pressing-in the catalyst retainer to a metal tubular member. See, for example, Japanese Patent No. 3527966.

In JP-A No. 2004-204819, after one layer out of two layers is formed, another layer is formed on the layer to form an integrated sheet. However, the man-hour for production is increased as compared to forming a retaining mat of a single layer, and productivity drops. In addition, in Japanese Patent No. 3527966, because an organic sheet is wound outside a retaining mat, a drop of productivity becomes a problem due to an increase in the production process.

In such a case of making the retaining mat of two layers and using an organic sheet in addition to a retaining mat as described above, because the clearance between the catalyst retainer and the metal tubular member for inserting the retaining mat reduces, in order to be able to obtain a predetermined interference of the retaining mat, if the inside diameter of the metal tubular member is the same, the outside diameter of the catalyst retainer should be made small.

If the outside diameter of the catalyst retainer is made small, the surface area of the catalyst reduces, and flow path resistance of an exhaust gas flow passage increases. Thereby, exhaust gas purification performance and engine performance are affected.

SUMMARY AND OBJECTS OF THE INVENTION

The present invention was developed in view of the circumstance, and its object of an embodiment of the present invention to provide a catalyst converter device for purifying exhaust gas capable of improving productivity and improving engine performance and exhaust gas purification performance.

In order to solve the problems, an embodiment of the present invention provides a catalyst converter device for purifying exhaust gas assembled by that a catalyst retainer (80) obtained by a catalyst that is carried by a ceramics honeycomb carrier of a cylindrical shape that is retained by a metal tubular member (82) covering the outer part of the catalyst retainer (80) through a retaining mat (81), wherein the thickness of the retaining mat (81) is set so that the apparent density of the retaining mat (81) during assembling becomes 0.25 g/cm$^3$ or more and less than 0.51 g/cm$^3$ and the outside diameter (D1) of the catalyst retainer (80) is set according to interference of the retaining mat when the retaining mat (81) wound around the catalyst retainer (80) passes through a press-in tool (105) that presses-in the catalyst retainer (80) to the metal tubular member (82). The interference of the retaining mat after being pressed into the metal tubular member (82) is set within a range that does not exceed a predetermined single body allowable strength of the catalyst retainer (80). The retaining mat (81) is formed of a non-expandable inorganic fiber sheet. A catalyst retainer pressing force (F) described below moves the catalyst retainer (80) in the axial direction with respect to the metal tubular member (82) that is obtained from pressure difference (P) of exhaust gas applied to the upstream side and downstream side of the catalyst retainer (80) when the catalyst converter device for purifying exhaust gas (63) is used inside an exhaust pipe (61) or inside a muffler (62) and an external force generated by vibration applied to the catalyst retainer (80). The length (L2) along the longitudinal direction of the catalyst retainer (80) in the retaining mat (81) wound around the catalyst retainer (80) is set longer than the winding diameter (D1) of the retaining mat (81) around the catalyst retainer (80) so that a retaining force (R) greater than the catalyst retainer pressing force (F) can be secured.

$$F = G \cdot M + P \cdot S$$

wherein

G: acceleration of vibration of the catalyst retainer during use

M: mass of the catalyst retainer

P: difference of the pressure of the exhaust gas applied to the upstream side and downstream side of the catalyst retainer during use S: pressure receiving area of the catalyst retainer According to the construction, an optimum size of the catalyst retainer taking the strength and rigidity of the catalyst retainer and productivity of the catalyst retainer, metal tubular member and retaining mat into account can be introduced by combining the range of the apparent density of the retaining mat of 0.25 g/cm$^3$ or more and less than 0.51 g/cm$^3$ and the retaining mat formed of a non-expandable inorganic fiber sheet. Thus, a retaining force retaining the catalyst retainer is enhanced by increasing the contact area between the retaining mat and the catalyst retainer/metal tubular member that is achieved by an increase in the length along the longitudinal direction of the catalyst retainer in the retaining mat. Therefore, an interference of the retaining mat can be reduced, and the outside diameter of the catalyst retainer can be increased. As a result of this construction, the density and thickness of ribs forming a honeycomb of the ceramics honeycomb carrier can be optimized with an increase in the surface area of the catalyst and a reduction in the flow path resistance. Thus, the exhaust gas purification performance and engine performance can be improved with pressing-in work being achieved easily and efficiently by a reduction in interference. Thus, productivity can be improved.

The construction may be such that the retaining force (R) retaining the catalyst retainer (80) during use is obtained from the coefficient of friction (μ) at a maximum use temperature of the retaining mat (81) after being heated for a predetermined time at the maximum use temperature and being set by fatigue, the contact pressure (CP) of the retaining mat (81) generated by interference of the retaining mat (81) at the maximum use temperature, and a contact area (A) between the metal tubular member (82) or the catalyst retainer (80) and the retaining mat. According to this construction, because the coefficient of friction of the retaining mat is measured after thermal setting of a predetermined time, the coefficient of friction of the retaining mat can be brought close to a value assuming the service life. In addition, the length of the retaining mat corresponding to the axial length of the catalyst retainer can be optimized based on a more precise lower limit value of the retaining force that dropped due to exposure to high temperature.

Further, the construction may be such that length (L2) of the retaining mat (81) is shorter than the length (L1) in the longitudinal direction of the catalyst retainer (80) by a predetermined length (α). According to this construction, the end of the retaining mat can be prevented from sticking out in the axial direction of an end of the catalyst retainer, and thereby the pressing-in work can be executed so that the retaining mat does not interfere in pressing-in the catalyst retainer wound with the retaining mat to the metal tubular member.

In addition, the construction may be such that the catalyst converter device for purifying exhaust gas (63) is welded to a downstream end of an exhaust pipe (61) stored inside the muffler (62). According to this construction, the muffler can be formed narrow and can be prevented from sticking out to the side of the saddle-ride type vehicle.

The construction may be such that a catalyst retainer (80) selected from among a plurality of kinds of the catalyst retainers (80) with different lengths is incorporated into the muffler (62). According to this construction, by unifying the outside diameter of the catalyst retainer, the pressing-in tool and the like can be shared, and the productivity can be improved further.

In the present invention, the thickness of the retaining mat is set so that the apparent density of the retaining mat during assembling becomes 0.25 g/cm$^3$ or more and less than 0.51 g/cm$^3$ and the outside diameter of the catalyst retainer is set according to interference of the retaining mat when the retaining mat wound around the catalyst retainer passes through the press-in tool that presses-in the catalyst retainer to the metal tubular member and interference of the retaining mat after being pressed into the metal tubular member within the range that does not exceed a predetermined single body allowable strength of the catalyst retainer. The retaining mat is formed of the non-expandable inorganic fiber sheet. The catalyst retainer pressing force F described below that moves the catalyst retainer in the axial direction with respect to the metal tubular member is obtained from a pressure difference of the exhaust gas applied to the upstream side and downstream side of the catalyst retainer when the catalyst converter device for purifying exhaust gas is used inside the exhaust pipe or inside the muffler and the external force generated by vibration applied to the catalyst retainer. The length along the longitudinal direction of the catalyst retainer in the retaining mat wound around the catalyst retainer is set longer than the winding diameter of the retaining mat around the catalyst retainer so that the retaining force greater than the catalyst retainer pressing force F can be secured. Therefore, the optimum size of the catalyst retainer taking the strength and rigidity of the catalyst retainer and productivity of the catalyst retainer, metal tubular member and retaining mat into account can be introduced by combining the range of the apparent density of the retaining mat of 0.25 g/cm$^3$ or more and less than 0.51 g/cm$^3$ and the retaining mat formed of the non-expandable inorganic fiber sheet. Thus, a retaining force retaining the catalyst retainer is enhanced by increase of the contact area between the retaining mat and the catalyst retainer/metal tubular member achieved by increase of the length along the longitudinal direction of the catalyst retainer in the retaining mat. Therefore, an interference of the retaining mat can be reduced, and the outside diameter of the catalyst retainer can be increased. As a result of it, the density and thickness of ribs forming a honeycomb of the ceramics honeycomb carrier can be optimized with an increase in the surface area of the catalyst and a reduction in the flow path resistance. Thus, exhaust gas purification performance and engine performance can be improved, pressing-in work can be achieved easily and efficiently by reduction of interference, and productivity can be improved.

$$F=G \cdot M + P \cdot S,$$

wherein

G: acceleration of vibration of the catalyst retainer during use

M: mass of the catalyst retainer

P: difference of the pressure of the exhaust gas applied to the upstream side and downstream side of the catalyst retainer during use S: pressure receiving area of the catalyst retainer In addition, the retaining force retaining the catalyst retainer during use is obtained from the coefficient of friction at a maximum use temperature of the retaining mat after being heated for a predetermined time at the maximum use temperature and being set by fatigue, the contact pressure of the retaining mat generated by interference of the retaining mat at the maximum use temperature, and a contact area between the metal tubular member or the catalyst retainer and the retaining mat. Accordingly, because the coefficient of friction of the retaining mat is measured after thermal setting of a predetermined time, the coefficient of friction of the retaining mat can be brought close to a value assuming the service life. Thus, the length of the retaining mat corresponding to the axial length of the catalyst retainer can be optimized based on a more precise lower limit value of the retaining force that dropped due to exposure to high temperature.

In addition, because the length of the retaining mat is shorter than the length in the longitudinal direction of the catalyst retainer by the predetermined length, the end of the retaining mat can be prevented from sticking out in the axial direction of the end of the catalyst retainer, and thereby the pressing-in work can be executed so that the retaining mat does not interfere in pressing-in the catalyst retainer wound with the retaining mat to the metal tubular member.

Further, because the catalyst converter device for purifying exhaust gas is welded to the downstream end of the exhaust pipe stored inside the muffler, the muffler can be formed narrow and can be prevented from sticking out to the side of the saddle-ride type vehicle.

Still further, because the catalyst retainer selected from among a plurality of kinds of the catalyst retainers with different length is incorporated into the muffler, by unifying the outside diameter of the catalyst retainer, the pressing-in tool and the like can be shared. Thus, the productivity can be improved further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

An embodiment of the present invention will be described below referring to drawings. The description of the direction such as front/rear, right/left and up/down is the same direction with respect to a vehicle body unless a particular description is provided. In addition, a reference sign FR shown in each drawing shows vehicle body front, a reference sign UP shows vehicle body upper, and a reference sign LE shows vehicle body left.

Figure 1:
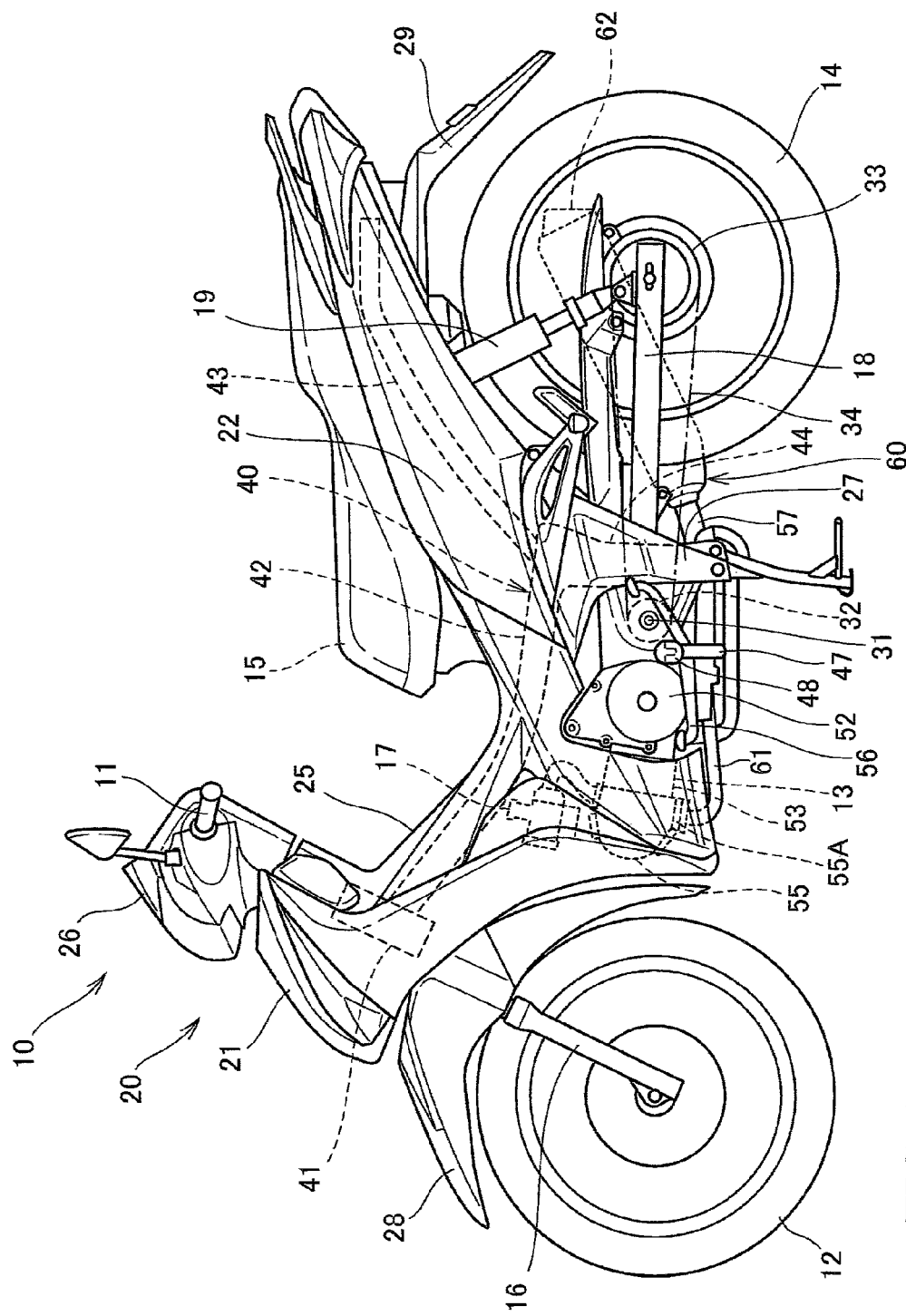
FIG. 1 is a left side view showing a motorcycle including a catalyst converter device for purifying exhaust gas of the present invention.

FIG. 1 is a left side view showing a motorcycle including a catalyst converter device for purifying exhaust gas of the present invention.

A motorcycle 10 is a saddle-ride type vehicle including a front wheel 12 arranged so as to be steerable by a handlebar 11 arranged in the vehicle front, an engine 13 as a drive source arranged behind the front wheel 12, a rear wheel 14 arranged behind the engine 13 and driven by the engine 13. A seat 15 is arranged in the upper part between the front wheel 12 and the rear wheel 14 wherein an occupant sits on the seat 15 in a straddling manner.

A vehicle body frame 40 of the motorcycle 10 includes a head pipe 41 steerably supporting a front fork 16 that supports the front wheel 12. A main frame 42 extends rearwardly and downwardly toward the vehicle rear from the head pipe 41 with a right and left pair of seat rails 43, 43 (only that of the reference sign 43 on the front side is shown) extending rearwardly and upwardly to the vehicle rear from the rear part of the main frame 42. A right and left pair of pivot plates 44, 44 (only the pivot plate 44 on the front side is shown) extend downwardly from the rear part of the main frame 42.

A swing arm 18 to that the rear wheel 14 is rockably journaled to the pivot plates 44, 44. Between the rear part of the swing arm 18 and the rear part of the seat rail 43, a rear shock absorber unit 19 is provided.

The motorcycle 10 is covered by a vehicle body cover 20 made of a resin. The vehicle body cover 20 includes a front cover 21 covering the front face of the vehicle, a right and left pair of side covers 22, 22 (only the side cover 22 on the front side is shown) arranged so as to continue from the rear part of the front cover 21 to the vehicle rear and covering the side faces of the vehicle, an upper cover 25 covering the upper part of the vehicle above the engine 13, and a pivot plate cover 27 covering the pivot plates 44.

The upper part of the front wheel 12 is covered by a front fender 28, the center part of the handlebar 11 is covered by a handlebar cover 26, and the upper part of the rear wheel 14 is covered by a rear fender 29.

The engine 13 is supported by an engine stay (not shown) so as to hang down from the main frame 42. The engine 13 is a single cylinder engine whose cylinder axis extends generally horizontally in the vehicle front/rear direction and includes a crankcase 52, a cylinder block 53, and a cylinder head 55 in this order from the vehicle rear side. A transmission (not shown) is provided integrally inside the crankcase 52. A gear shift pedal 56 is provided in the crankcase 52.

An output shaft 31 of the engine 13 protrudes on the left side surface of the crankcase 52, a chain 34 is wound between a drive sprocket 32 arranged on the output shaft 31 and a driven sprocket 33 provided on the rear wheel 14, and the rear wheel 14 is driven.

A step stay 47 extending in the vehicle width direction is attached to the lower surface of the engine 13, and a right and left pair of steps 48, 48 (only the step 48 on the front side is shown) for a rider are provided in both ends of the step stay 47.

Above the cylinder head 55, a throttle body 17 connected to an intake port of the cylinder head 55 is provided.

To an exhaust port 55A formed on the lower surface of the cylinder head 55, an exhaust muffler device 60 is connected that extends to the vehicle rear passing the vehicle right side that is opposite to the vehicle left side where the chain 34 is arranged.

Figure 2:
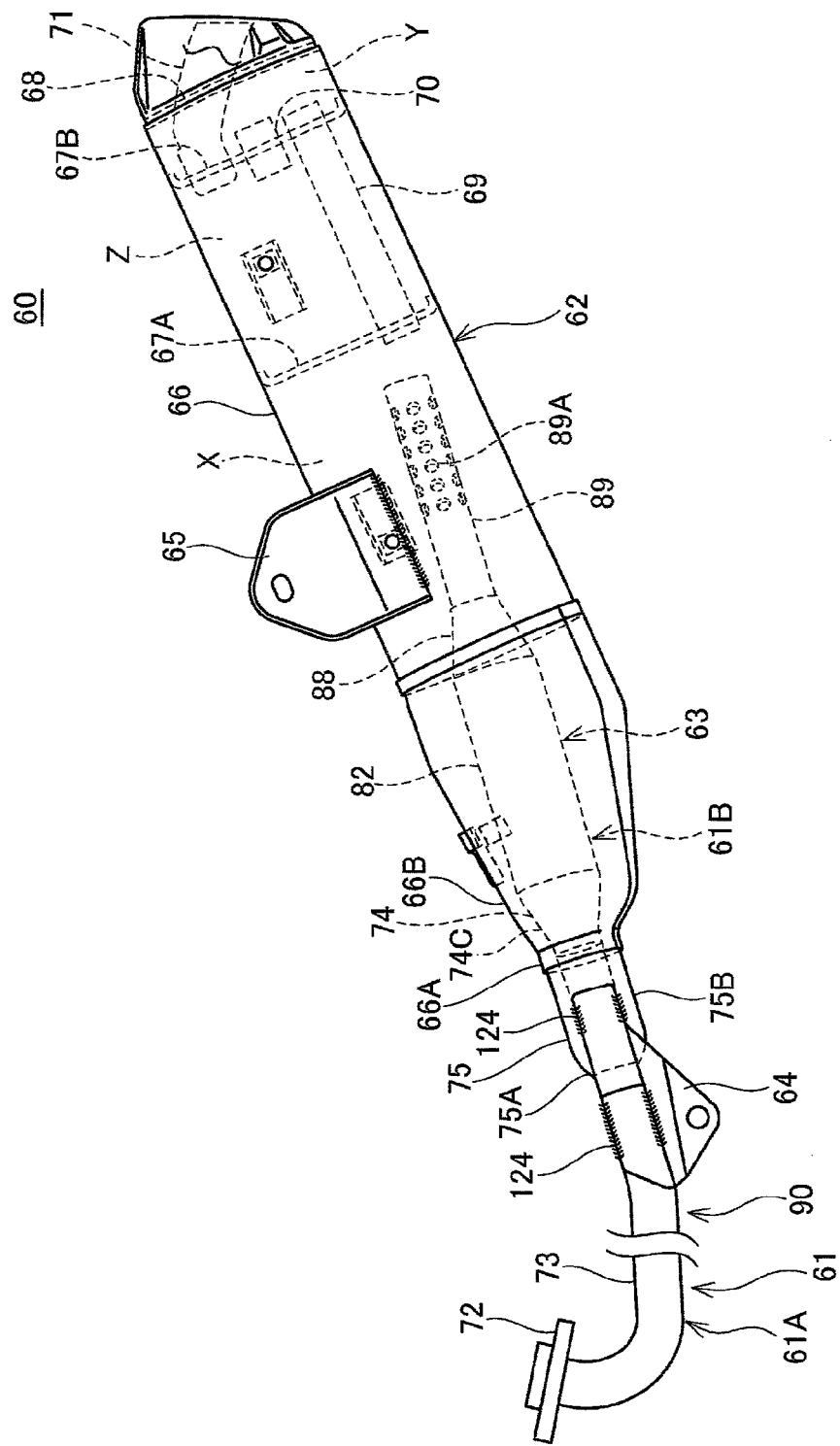
FIG. 2 is a side view showing an exhaust muffler device.

FIG. 2 is a side view showing the exhaust muffler device 60.

As shown in FIG. 1 and FIG. 2, the exhaust muffler device 60 includes an exhaust pipe 61 connected to the exhaust port 55A and extending rearwardly and a muffler 62 connected to the exhaust pipe 61, decompressing high temperature and high pressure exhaust gas having passed through the exhaust pipe 61, and discharging the exhaust gas to the outside. The rear part of the exhaust pipe 61 extends to the inside of the muffler 62 with a catalyst converter device 63 that purifies exhaust gas being provided in the rear part of the exhaust pipe 61 and being stored inside the muffler 62.

The exhaust muffler device 60 is fixed to the vehicle body side by bolts and the like through a front hanger part 64 arranged in the exhaust pipe 61 and a rear hanger part 65 arranged in the muffler 62.

The muffler 62 includes a body case 66 formed into a cylindrical shape with a diameter larger than that of the exhaust pipe 61, and is a multi-stage expansion type silencer in that the internal space of the body case 66 is partitioned into a plurality of expansion chambers X, Y, Z by multiple separation walls 67A, 67B and a rear wall 68. The expansion chamber X in the front and the expansion chamber Y in the rear communicate with each other by a first communication pipe 69 that passes through the expansion chamber Z in the center and penetrates the separation walls 67A, 67B, the expansion chamber Y and the expansion chamber Z communicate with each other by a second communication pipe 70 that penetrates the separation wall 67B, and the expansion chamber Z communicates with the outside of the muffler 62 by a tail pipe 71 that penetrates the separation wall 67B and the rear wall 68.

In the front part of the body case 66, a taper part 66B is formed whose diameter reduces as it goes toward an upstream end 66A side to which the exhaust pipe 61 is connected.

The exhaust gas flows in from the exhaust pipe 61 to the expansion chamber X, passes through the first communication pipe 69, flows into the expansion chamber Y, reverses the flow direction, passes through the second communication pipe 70, flows into the expansion chamber Z, reverses the flow direction again, passes through the tail pipe 71, and is discharged to the outside.

Figure 3:
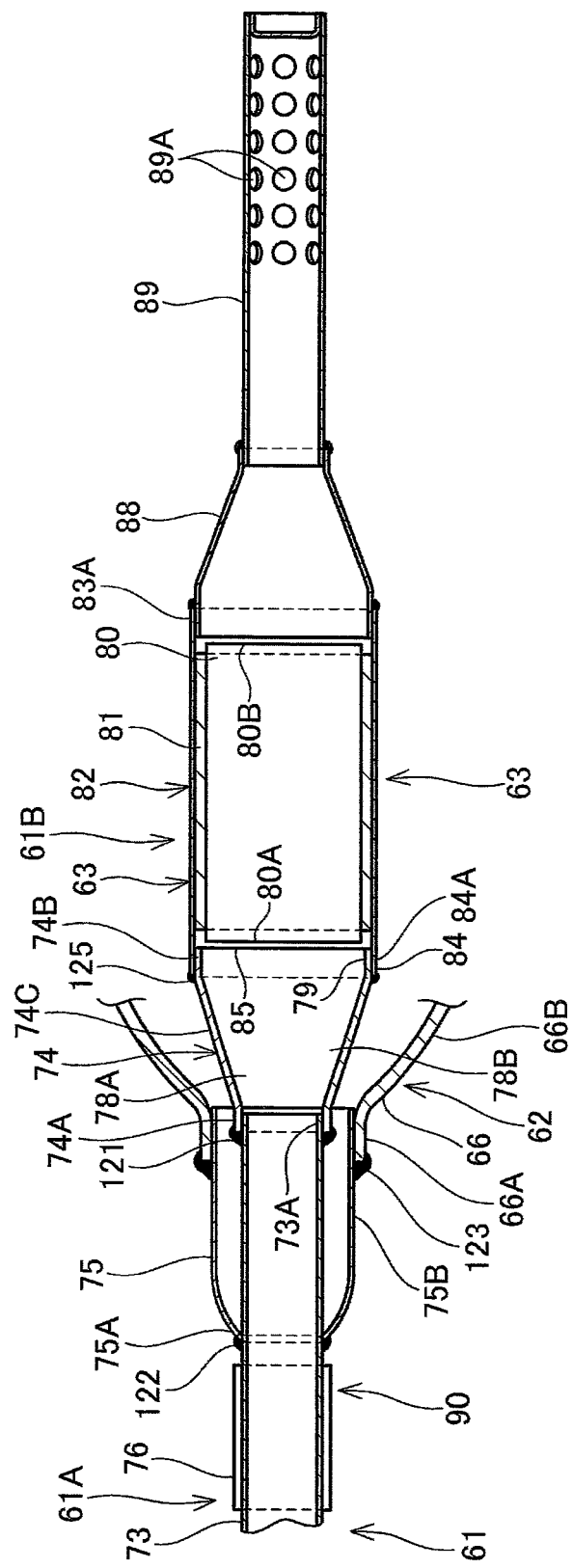
FIG. 3 is a cross-sectional view showing a rear part of an exhaust pipe.

FIG. 3 is a cross-sectional view showing the rear part of the exhaust pipe 61.

As shown in FIG. 2 and FIG. 3, the exhaust pipe 61 is formed into a shape of one pipe extending in the front and rear direction by joining plural pipes by welding.

The exhaust pipe 61 includes an exhaust pipe upstream part 61A that constitutes the upstream side of a flow of exhaust gas and an exhaust pipe downstream part 61B connected to the downstream end of the exhaust pipe upstream part 61A.

The exhaust pipe upstream part 61A includes an exhaust port connection part 72 that includes a flange connected to the exhaust port 55A, a pipe part 73 extending from the exhaust port connection part 72 to the catalyst converter device 63 side, a downstream taper pipe part 74 extending from the pipe part 73 and connected to the catalyst converter device 63, and an outer pipe 75 covering the rear part of the pipe part 73 from the outside in a state of having a gap between the outer pipe 75 and the pipe part 73. The exhaust pipe downstream part 61B includes the catalyst converter device 63, and a taper pipe 88 and a pipe 89 connected to the downstream side of the catalyst converter device 63.

The downstream taper pipe part 74 of the exhaust pipe upstream part 61A includes a front connection part 74A fitted to the outer peripheral surface of a rear end 73A of the pipe part 73, a rear connection part 74B connected to the catalyst converter device 63, and a taper part 74C diameter-increased as it goes to the side of the rear connection part 74B on the downstream side between the front connection part 74A and the rear connection part 74B. Further, a weld bead 121 is formed in welding the front connection part 74A to the pipe part 73.

The outer pipe 75 includes a diameter-reduced end 75A at the upstream end, and is fixed wherein the end 75A fitted to the outer peripheral surface of the pipe part 73 is welded thereto. The downstream end of the outer pipe 75 is positioned in the vicinity of the rear end 73A of the pipe part 73. A weld bead 122 is formed in welding the end 75A to the pipe part 73. A Weld bead 123 is formed in welding the upstream end 66A of the body case 66 of the muffler 62 to an outer peripheral surface 75B of the outer pipe 75.

The space of the muffler 62 inside the taper part 66B and the outer pipe 75 is a part of the expansion chamber X (refer to FIG. 2).

To the upstream side of the outer pipe 75 in the outer peripheral surface of the pipe part 73, a reinforcing plate 76 of a semicircle cross-sectional shape is welded. The front hanger part 64 is welded to the pipe part 73, the reinforcing plate 76 and the outer pipe 75 from the outside and is fixed. A weld bead 124 is formed in welding the front hanger part 64 to the pipe part 73, the reinforcing plate 76 and the outer pipe 75.

Figure 4:
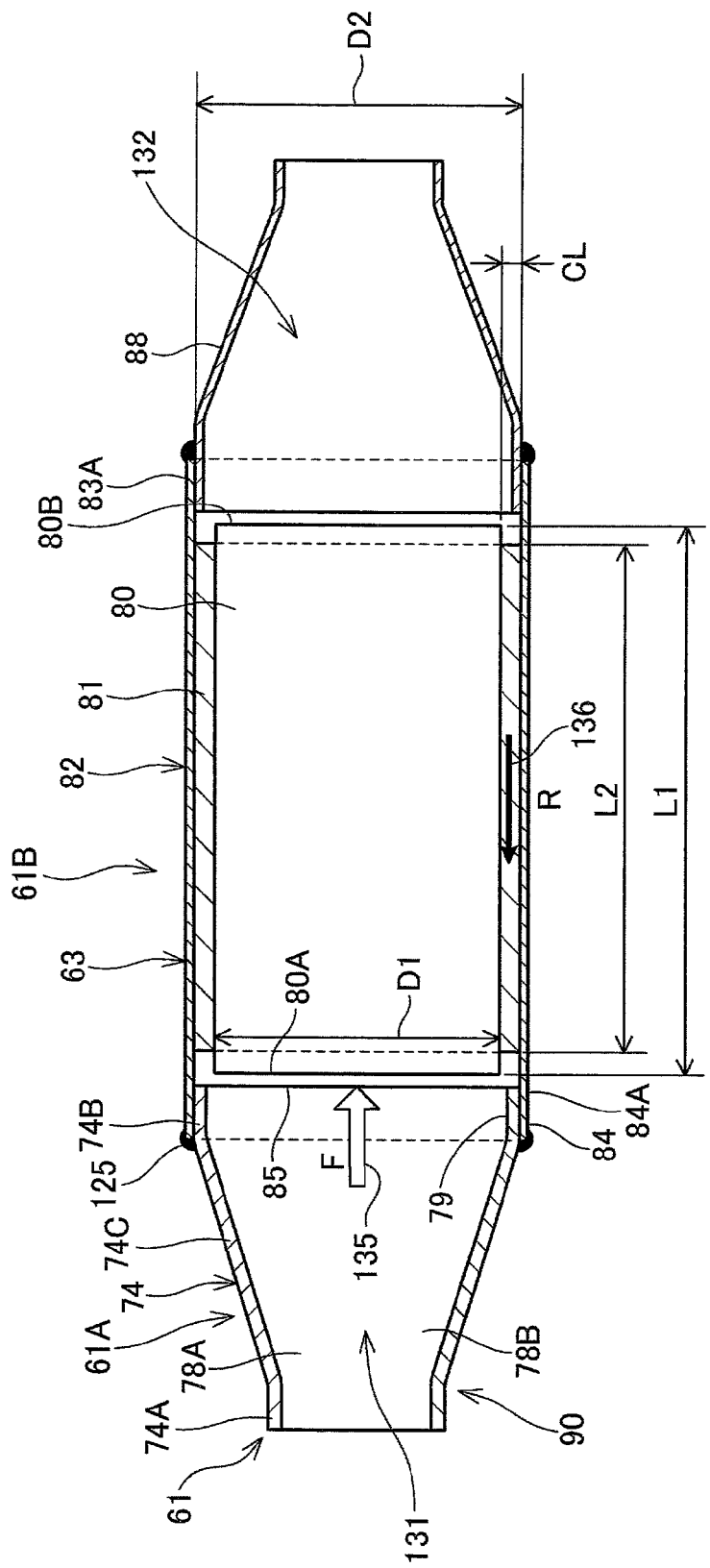
FIG. 4 is a cross-sectional view showing a catalyst converter device.

FIG. 4 is a cross-sectional view showing the catalyst converter device 63.

As shown in FIG. 3 and FIG. 4, the catalyst converter device 63 is composed of a catalyst retainer 80 of a cylindrical shape, a retaining mat 81 wound around the outer periphery of the catalyst retainer 80, and a retaining tube 82 retaining the catalyst retainer 80 inside through the retaining mat 81. More specifically, the catalyst retainer 80 is retained so as not to be shifted in the axial direction only by interference of the retaining mat 81.

The catalyst converter device 63 is formed to have a diameter larger than that of the exhaust pipe upstream part 61A. Exhaust gas flowing in from the exhaust pipe upstream part 61A to the catalyst converter device 63 is purified by the catalyst retainer 80, and the pressure thereof is relaxed.

The catalyst retainer 80 includes a ceramics honeycomb carrier made of ceramics formed into a porous structure of a shape of a honeycomb having a great number of pores extending along the axial direction inside the outline of the cylindrical shape thereof with the surface area inside thereof being increased. Platinum, rhodium and palladium are provided as a catalyst purifying exhaust gas components that are carried by walls of respective pores of the ceramics honeycomb carrier. Because porous ceramics is used as a carrier, platinum, rhodium and palladium can be carried easily. As a preferable example of the material of ceramics, it is possible to use various kinds of heat resistant ceramics including cordierite, mullite, alumina, aluminates of alkaline earth metal, silicon carbide, silicon nitride, and the like, or their analogs.

The retaining mat 81 is a non-expandable inorganic fiber sheet obtained by compressing or integrating fibers made of ceramics and being formed into a shape of a long mat, is wound around the outer peripheral surface of the catalyst retainer 80, and is sandwiched between the catalyst retainer 80 and the retaining tube 82. Because the retaining mat 81 is an assembly of entwined fibers, it has comparatively high elasticity. The material of the retaining mat 81 only has to be one having heat resistance and elasticity, and one obtained by integrating fiber-like metal. A retaining mat 81 made of glass wool and the like can be also used. For example, in a thermally expandable retaining mat, when used for a long time in a high temperature environment, setting by fatigue is liable to occur and an interference of the retaining mat is liable to drop. However, in the retaining mat 81 formed of the non-expandable inorganic fiber sheet, high elasticity is maintained for a long period of time even in a high temperature environment, and a drop in interference of the retaining mat is suppressed.

The length L1 in the longitudinal direction (axial direction) of the catalyst retainer 80 is formed longer than the length L2 in the longitudinal direction of the retaining mat 81 of a state wound around the catalyst retainer 80 (the length along the longitudinal direction of the catalyst retainer 80). This is for the purpose that the end of the retaining mat 81 does not stick out of the end of the catalyst retainer 80 in the axial direction, and thereby, pressing-in work can be executed without being interfered by the retaining mat 81.

With respect to the material of the retaining tube 82, metal with high strength and heat resistance is used, and, for example, steel such as ferrite-based stainless steel can be used. The total length of the retaining tube 82 is longer than the total length of the catalyst retainer 80.

As shown in FIG. 4, the rear connection part 74B of the downstream taper pipe part 74 of the exhaust pipe upstream part 61A is fitted and welded to the inner periphery part of the retaining tube 82. A weld bead 125 is formed in welding the rear connection part 74B and the retaining tube 82 with each other.

The catalyst retainer 80 is pressed into and incorporated into the retaining tube 82 in a state wherein the retaining mat 81 is wound around the outer periphery thereof. D1 is the outside diameter of the catalyst retainer 80, and D2 is the inside diameter of the retaining tube 82.

As shown in FIG. 3, to the inner periphery part of a downstream end 83A of the retaining tube 82, the taper pipe 88 whose diameter reduces as it goes to the downstream side of the exhaust gas is fitted and welded. The pipe 89 whose rear end is closed is connected to the downstream end of the taper pipe 88, and exhaust gas flows into the expansion chamber X (refer to FIG. 2) passing through plural small holes 89A formed on the outer peripheral surface of the pipe 89.

As shown in FIG. 2, although the catalyst converter device 63 is formed long in the axial direction than in the radial direction, because the periphery is covered by the body case 66 of the muffler 62, the strength can be sufficiently secured even when the catalyst converter device 63 is slender. In addition, because the catalyst converter device 63 is slender, the muffler 62 can be made compact in the radial direction, and the exhaust muffler device 60 is easy in layout even in a saddle-ride type vehicle not having room for a layout space.

Further, because the catalyst converter device 63 is stored in the body case 66, components arranged around the muffler 62 can be protected against radiation heat of the catalyst converter device 63. In addition, because the single catalyst retainer 80 (refer to FIG. 3) is arranged in the taper part 66B formed to have a small diameter on the upstream side of the body case 66, the catalyst retainer 80 can be activated quickly by the heat of exhaust gas while the muffler 62 is made compact.

The manufacturing process of the exhaust muffler device 60 will be described.

In FIG. 2, the exhaust muffler device 60 is assembled by connecting the exhaust pipe downstream part 61B that includes the catalyst converter device 63 and the exhaust pipe upstream part 61A with each other, and thereafter connecting the body case 66.

Figure 5:
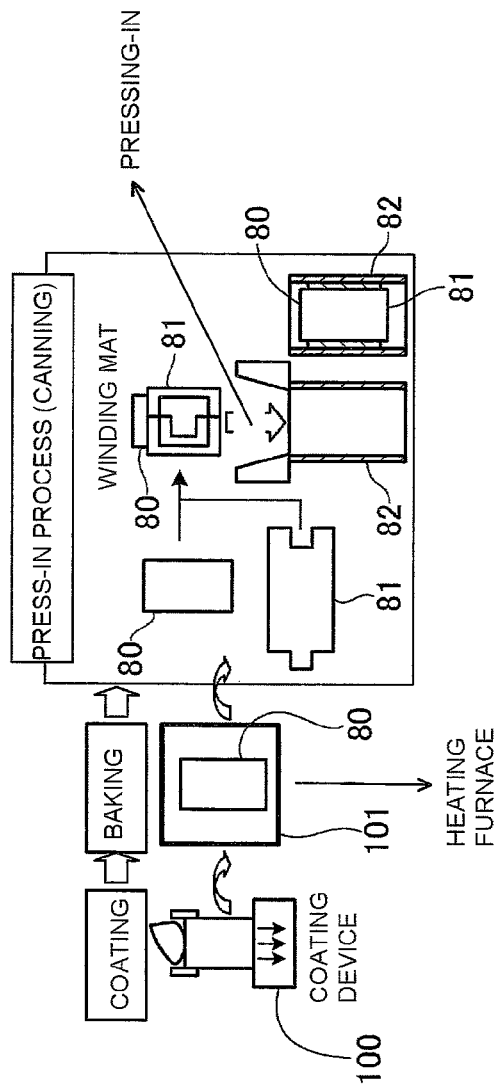
FIG. 5 is an action drawing showing a manufacturing process of a catalyst converter device.

FIG. 5 is a drawing showing a manufacturing process of the catalyst device.

First, a solution of catalyst compositions is coated on the base material of a cylindrical shape by a coating device 100 and is baked by a heating furnace 101, thereby the catalyst compositions are fixed to the base material, and the catalyst retainer 80 is formed. The process of coating and baking is executed once or a plurality of times. Next, in a press-in process, the retaining mat 81 is wound around the catalyst retainer 80, the catalyst retainer 80 and the retaining mat 81 are pressed into the retaining tube 82 from the downstream end 83A (refer to FIG. 3), and the catalyst converter device 63 (refer to FIG. 3) is completed. Thereafter, in FIG. 3, the taper pipe 88 welded integrally with the pipe 89 is fitted and welded to the inner periphery part of the downstream end 83A of the catalyst converter device 63. Further, although the processes of coating and baking were described to be executed before the press-in process. However, the present invention is not limited to this, and coating and baking may be executed only in a process after the press-in process, or in both processes of before and after the press-in process.

As described above, the catalyst converter device 63 is assembled by those produced with a predetermined dimensional tolerance without measuring the outside diameter of the catalyst retainer 80, the thickness of the retaining mat 81, and the inside diameter of the retaining tube 82. By assembling respective production components without measuring. Thus, productivity can be improved because there is no measuring process.

As shown in FIG. 3, the exhaust pipe upstream part 61A is prepared as a small assembly 90 formed by welding the exhaust port connection part 72 (FIG. 2), the pipe part 73, the downstream taper pipe part 74, the outer pipe 75, the reinforcing plate 76, and the front hanger part 64 integrally in advance. At a stage where the small assembly 90 has been formed, presence/absence of a back bead of weld sections of the weld beads 121, 122, 123, 124 (refer to FIG. 2) and the reinforcing plate 76 is checked, and the back bead is removed if necessary.

Next, the rear connection part 74B of the downstream taper pipe part 74 of the small assembly 90 is fitted and welded to a front end 84A of the retaining tube 82.

After the small assembly 90 and the catalyst converter device 63 have been welded with each other by the weld bead 125, the rear part of the exhaust pipe upstream part 61A and the catalyst converter device 63 are inserted into the body case 66 of the muffler 62, and the upstream end 66A of the body case 66 is fitted to the outer peripheral surface 75B of the outer pipe 75 and is welded by the weld bead 123.

Figure 6:
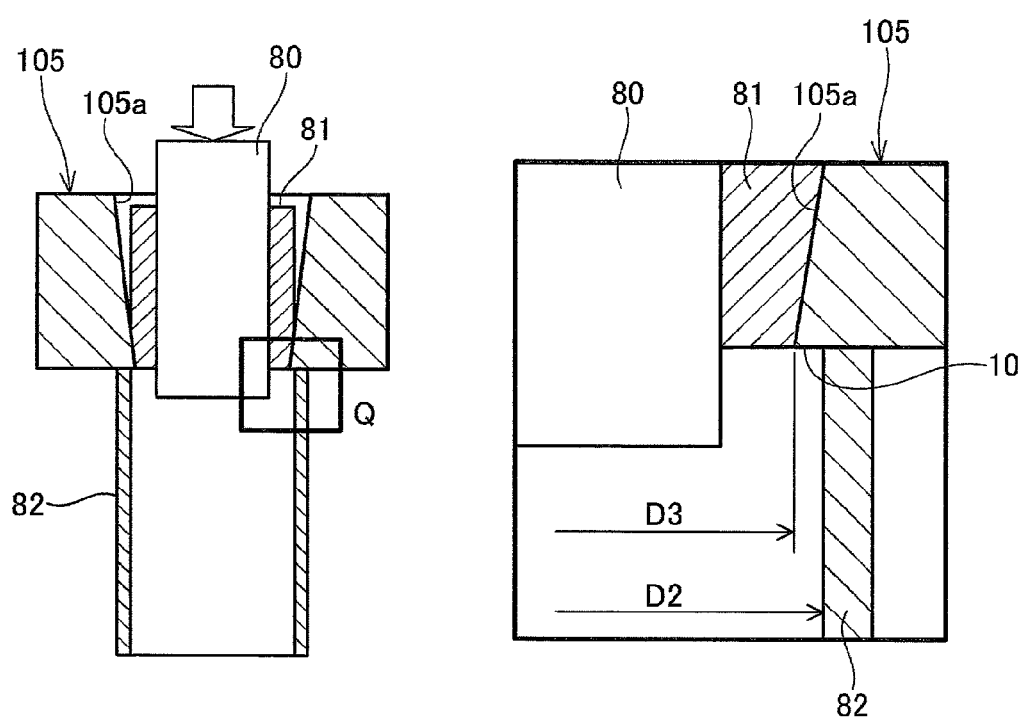
FIG. 6 is an action drawing showing a press-in process of a catalyst converter device.

FIG. 6 is an action drawing showing a press-in process of the catalyst converter device 63. In addition, the enlarged view of a scope Q shown in the drawing in the left is shown in the right.

In the press-in process, the retaining tube 82 is erected, a press-in tool 105 is put on the upper end of the retaining tube 82, the catalyst retainer 80 wounded with the retaining mat 81 is inserted from the top into a downward-narrowed tapered hole 105a provided in the press-in tool 105, and the catalyst retainer 80 and the retaining mat 81 are pressed into the retaining tube 82. At this time, the inside diameter D3 of a lower end 105b of the tapered hole 105a is a section that becomes the minimum diameter of the tapered hole 105a and is smaller than the inside diameter D2 of the retaining tube 82. Therefore, when the catalyst retainer 80 and the retaining mat 81 pass through the lower end 105b, the apparent density (filling density) of the retaining mat 81 becomes greater than the apparent density after being pressed into the retaining tube 82, and becomes maximum among all processes.

The apparent density of the retaining mat 81 is the weight per unit volume of the retaining mat 81, and apparent density=W/CL (g/cm$^3$), wherein:

W is a basis weight (unit is g/cm$^2$) of the retaining mat, CL is the gap (unit is cm) between the catalyst retainer and the retaining tube.

From the above, it is necessary to decide the outside diameter D1 of the catalyst retainer 80 achieving the gap (clearance) CL (refer to FIG. 4) between the inside diameter of the retaining tube 82 and the outside diameter D1 of the catalyst retainer 80 that prevents damage of the retaining mat 81 and breakage of the catalyst retainer 80 during pressing-in described above. When the gap CL is decided, interference after pressing-in relative to the initial thickness of the retaining mat 81 is decided, and the apparent density after pressing-in of the retaining mat 81 is decided.

Figure 7:
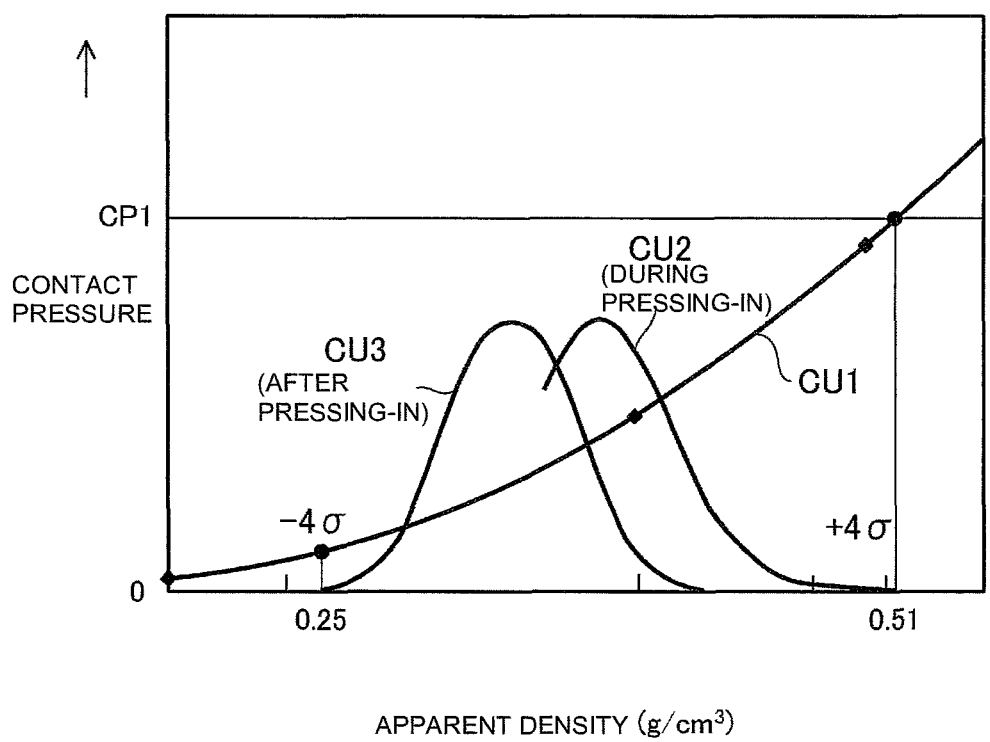
FIG. 7 is a graph showing the relation between the contact pressure and apparent density of a retaining mat.

FIG. 7 is a graph showing the relation between the contact pressure and the apparent density of the retaining mat. The axis of ordinates of the graph is the contact pressure of the retaining mat after pressing-in, and the axis of abscissas is the apparent density (unit is g/cm$^3$) of the retaining mat after pressing-in.

CU1 in the drawing is a curve showing the relation between the apparent density and the contact pressure when the retaining mat is compressed, wherein, as the apparent density increases, the contact pressure also increases.

The contact pressure of the retaining mat should be less than the contact pressure CP1 in order to be in the range of the strength of the catalyst retainer or less. The apparent density when the contact pressure is CP1 is 0.51 g/cm$^3$, and the apparent density should be less than 0.51 g/cm$^3$.

In addition, when the inside diameter of the retaining tube has been decided, the maximum outside diameter and the median of the outside diameter of the catalyst retainer can be obtained so as to satisfy the apparent density. In the calculation, the product tolerance of the outside diameter of the catalyst retainer, the inside diameter of the retaining tube, and the thickness and the basis weight of the retaining mat are taken into account.

Further, based on the product tolerance of the outside diameter of the catalyst retainer, the inside diameter of the retaining tube, and the basis weight of the retaining mat, a normal distribution curve CU2 of the apparent density during pressing-in and a normal distribution curve CU3 of the apparent density after pressing-in are obtained from the maximum outside diameter and the median of the outside diameter of the catalyst retainer obtained as described above.

In the normal distribution curve CU2 during pressing-in, the value of +4σ is 0.51 g/cm$^3$. Further, in the normal distribution curve CU3 after pressing-in, the value of −4σ is 0.25 g/cm$^3$, and this value is the lower limit value of the apparent density.

Whether the catalyst retainer shifts relative to the retaining tube or not, that is, whether the retaining force retaining the catalyst retainer is sufficient or not, when a catalyst converter device including the catalyst retainer whose outside diameter has been decided as described above, the retaining mat and the retaining tube in that the lower limit value of the apparent density of the retaining mat is 0.25 g/cm$^3$ is actually incorporated into the exhaust muffler device and the engine is operated is verified as described below.

In a space 131 on the upstream side of the catalyst retainer 80 and in a space 132 on the downstream side of the catalyst retainer 80 in the exhaust pipe 61 shown in FIG. 4, during operation of the engine, a pressure P1 is applied to the space 131, a pressure P2 lower than the pressure P1 is applied to the space 132, and, as a result, a pressing force F pressing the catalyst retainer 80 to the downstream side is generated in the catalyst retainer 80 as shown by a reverse printed arrow 135. In addition, because vibration in the axial direction is transmitted to the catalyst retainer 80 during operation of the engine, an external force that makes the catalyst retainer 80 move in the axial direction by the vibration is included in the pressing force F.

More specifically, the pressing force F (unit is N) is obtained by F=G·M+P·S, wherein:

G is the acceleration (unit is m/s$^2$) of vibration of the catalyst retainer 80 during operation of the engine, M is the mass (unit is kg) of the catalyst retainer 80, P is the pressure difference P (=P1−P2) (unit is Pa) between the front and rear of the catalyst retainer 80 during operation of the engine, and S is the pressure receiving area (unit is m$^2$) of the catalyst retainer 80. The outside diameter D1 of the catalyst retainer 80 used is 40 mm for example, and the axial length L1 is 60 mm, 75 mm, 90 mm for example. Further, the length in the longitudinal direction (axial length) L2 of the retaining mat 81 is L2=(L1−α) mm, for example, wherein the predetermined length α=10 mm, L2=50 mm, 65 mm, 80 mm.

On the other hand, between the catalyst retainer 80 and the retaining mat 81 or between the retaining mat 81 and the retaining tube 82, as shown by an arrow mark 136, a retaining force R retaining the catalyst retainer 80 within the retaining tube 82 is generated. The retaining force R takes setting by fatigue of the retaining mat 81 after the catalyst retainer is exposed to an environment of the maximum temperature (900° C. for example) for a predetermined time (100 hours for example) during operation of the engine and drop of the retaining force due to increase of the clearance between the catalyst retainer and the retaining tube at a high temperature into account.

The retaining force R is obtained by R(N)=μ·CP·A, wherein:

μ is the coefficient of friction between the catalyst retainer 80 and the retaining mat 81 or between the retaining mat 81 and the retaining tube 82, CP is the contact pressure (unit is Pa) of the retaining mat, A is the contact area (unit is m$^2$) between the retaining mat 81 and the retaining tube 82 (or the catalyst retainer 80).

When the pressing force F and the retaining force R are equal to each other or, preferably, the retaining force R is greater than the pressing force F, the catalyst retainer 80 is retained within the retaining tube 82.

Thus, by verification of shifting of the catalyst retainer taking the situation after operation of the engine into account, it has been confirmed that the catalyst retainer can be retained even when the lower limit value of the apparent density is 0.25 g/m$^3$.

As described above, the inside diameter of the retaining mat 81 when the retaining mat 81 is wound around the catalyst retainer 80, that is, the winding diameter, is D1 that is equal to the outside diameter D1 of the catalyst retainer 80, and, when the length L2 along the longitudinal direction of the catalyst retainer 80 in the retaining mat 81 wound around the catalyst retainer 80 is made an axial length L2, the axial length L2 is longer than the winding diameter D1 (D1<L2). With such a relation, the contact area A of the the retaining mat 81. described above can be made larger than a conventional one, and a greater retaining force R can be secured. The relation between the axial length L2 of the retaining mat 81 and the retaining force R described above is shown in FIG. 8.

Figure 8:
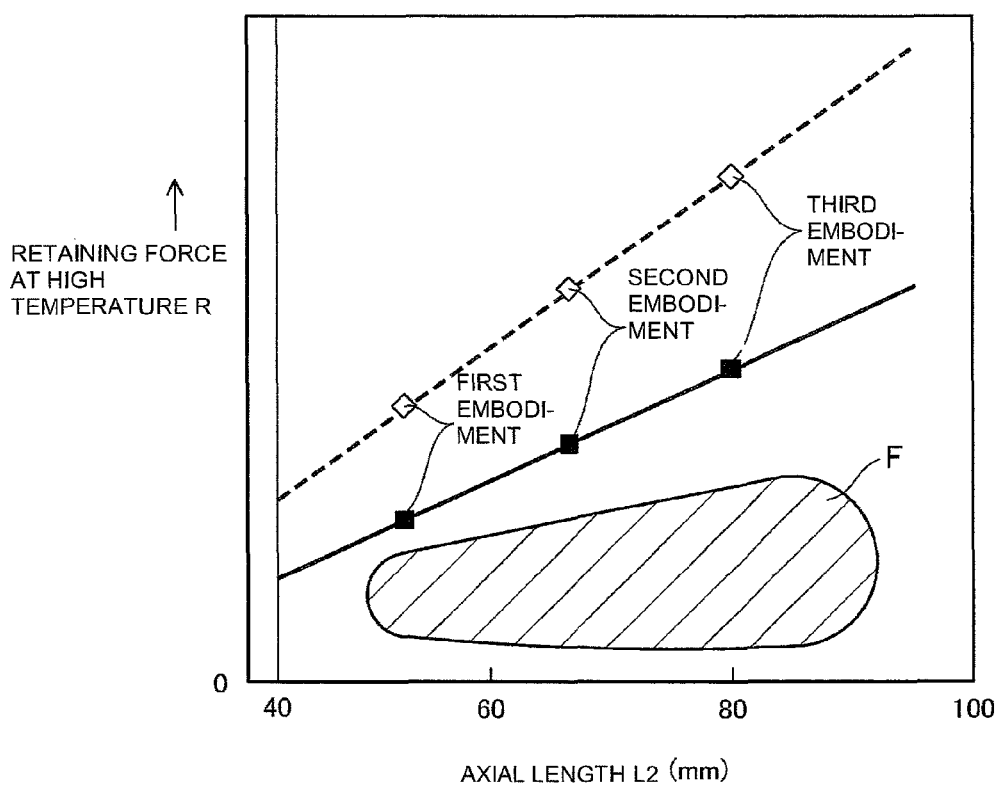
FIG. 8 is a graph showing the relation between the retaining force at a high temperature of a catalyst retainer and the axial length of a retaining mat.

FIG. 8 is a graph showing the relation between the retaining force R of the catalyst retainer at a high temperature and the axial length L2 of the retaining mat. The axis of ordinates of the graph expresses the retaining force R at a high temperature (the condition at the maximum temperature during operation of the engine), and the axis of abscissas expresses the axial length L2 (unit is mm) of the retaining mat. The solid line in the graph is a straight line passing the data in the lower limit values of interference (0.25 g/cm$^3$ that is the lower limit value of the apparent density) of a first embodiment (L2=50 mm), a second embodiment (L2=65 mm), and a third embodiment (L2=80 mm), and the broken line in the graph is a straight line passing the data in the median of interference (0.35 g/cm$^3$ that is the median of the apparent density) of the first embodiment to the third embodiment. In addition, the hatched region in the graph is the catalyst retainer pressing force F. Further, the outside diameters of the catalyst retainers of the first embodiment to the third embodiment are the same to each other (D1=40 mm).

The retaining force R at a high temperature at the lower limit value of interference and the median of interference is greater than the catalyst retainer pressing force F, and both increase gradually as the axial length L2 increases. From this, by making the axial length L2 larger than the outside diameter of the catalyst retainer, that is, the winding diameter D1 of the retaining mat, it becomes advantageous as the retaining force R, and interference can be reduced while securing a predetermined retaining force R.

As shown in FIG. 2, FIG. 4, FIG. 6 and FIG. 7 above, in the catalyst converter device 63 assembled wherein the catalyst retainer 80 is obtained by the catalyst carried by the ceramics honeycomb carrier of a cylindrical shape and is retained by the retaining tube 82 as the metal tubular member covering the outer part of the catalyst retainer 80 through the retaining mat 81, the thickness of the retaining mat 81 is set so that the apparent density of the retaining mat 81 during assembling becomes 0.25 g/cm$^3$ or more and less than 0.51 g/cm$^3$ and the outside diameter D1 of the catalyst retainer 80 is set according to interference of the retaining mat when the retaining mat 81 wound around the catalyst retainer 80 passes through the press-in tool 105 that presses-in the catalyst retainer 80 to the retaining tube 82 and interference of the retaining mat after being pressed into the retaining tube 82 within a range that does not exceed a predetermined single body allowable strength of the catalyst retainer 80. The retaining mat 81 is formed of a non-expandable inorganic fiber sheet with the length L2 along the longitudinal direction (axial length) of the catalyst retainer 80 in the retaining mat 81 wound around the catalyst retainer 80 being set longer than the winding diameter D1 of the retaining mat 81 around the catalyst retainer 80 so that the retaining force R greater than the catalyst retainer pressing force F can be secured, the catalyst retainer pressing force F described below that moves the catalyst retainer 80 in the axial direction with respect to the retaining tube 82 is obtained from a pressure difference P of exhaust gas applied to the upstream side and downstream side of the catalyst retainer 80 when the catalyst converter device 63 is used inside the exhaust pipe 61 or inside the muffler 62 and the external force is generated by vibration applied to the catalyst retainer 80.

$$F = G \cdot M + P \cdot S,$$

wherein:
G is the acceleration of vibration of the catalyst retainer during use, M is the mass of the catalyst retainer, P is the difference of the pressure of the exhaust gas applied to the upstream side and downstream side of the catalyst retainer during use, and S is the pressure receiving area of the catalyst retainer.

According to the construction, an optimum size of the catalyst retainer 80 taking the strength and rigidity of the catalyst retainer 80 and productivity of the catalyst retainer 80, the retaining tube 82, and the retaining mat 81 into account can be led by combining the range of the apparent density of the retaining mat 81 of 0.25 g/cm$^3$ or more and less than 0.51 g/cm$^3$ and the retaining mat 81 formed of a non-expandable inorganic fiber sheet. Thus, the retaining force R retaining the catalyst retainer 80 is enhanced by an increase in the contact area A between the retaining mat 81 and the catalyst retainer 80/the retaining tube 82 achieved by increase of the length L2 along the longitudinal direction of the catalyst retainer 80 in the retaining mat 81. Therefore interference of the retaining mat 81 can be reduced, and the outside diameter D1 of the catalyst retainer 80 can be increased. As a result, the density and thickness of ribs forming a honeycomb of the ceramics honeycomb carrier can be optimized with an increase in the surface area of the catalyst and a reduction in the flow path resistance. Thus, exhaust gas purification performance and engine performance can be improved, pressing-in work can be achieved easily and efficiently by reduction in interference, and productivity can be improved. In addition, even when there is a variation of components of the product, pressing-in work without measurement quality-assured by upper and lower limits is allowed.

Further, the retaining force R retaining the catalyst retainer 80 during use is obtained from the coefficient of friction μ at the maximum use temperature of the retaining mat 81 after being heated for a predetermined time at the maximum use temperature and being set by fatigue, the contact pressure CP of the retaining mat 81 generated by interference of the retaining mat 81 at the maximum use temperature, and the contact area A between the retaining tube 82 or the catalyst retainer 80 and the retaining mat 81. Therefore, the coefficient of friction μ of the retaining mat 81 can be brought close to a value assuming the service life by measuring the coefficient of friction μ of the retaining mat 81 after thermal setting by fatigue for a predetermined time. In addition, the length of the retaining mat corresponding to the axial length of the catalyst retainer 80 can be optimized based on a more precise lower limit value of the retaining force R that dropped due to an exposure to a high temperature.

In addition, the axial length L2 of the retaining mat 81 is shorter than the axial length L1 of the catalyst retainer 80 by the predetermined length α. Therefore, the end of the retaining mat 81 can be prevented from sticking out of the end of the catalyst retainer 80 in the axial direction. Thus, the pressing-in work can be executed so that the retaining mat 81 does not interfere in pressing-in the catalyst retainer 80 wound with the retaining mat 81 to the retaining tube 82.

Further, because the catalyst converter device 63 is welded to the downstream end of the exhaust pipe 61 stored inside the muffler 62 as shown in FIG. 1 and FIG. 2, therefore the muffler 62 can be formed slender and can be prevented from sticking out to the side of the motorcycle 10 (refer to FIG. 1) as a saddle-ride type vehicle.

Further, with respect to the catalyst converter device 63, a catalyst retainer 80 selected from among a plurality of kinds of the catalyst retainers 80 with different length is incorporated into the muffler 62. Therefore, by unifying the outside diameter D1 of the catalyst retainer 80, the press-in tool 105 and the like can be shared, and the productivity can be improved further.

The embodiment described above simply shows an aspect of the present invention, and alteration and application are possible optionally within a scope not departing from the objects of the present invention.

For example, in the embodiment, the catalyst converter device 63 was arranged inside the muffler 62 as shown in FIG. 2, however the present invention is not limited to this arrangement. The catalyst converter device 63 may be arranged only in the middle of the exhaust pipe.

In addition, the present invention is not limited to a case of being applied to a motorcycle 10, and can be applied to vehicles such as an automobile and the like, general purpose machines, industrial machines, power generators, and heat exchangers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A catalyst converter device for purifying exhaust gas with a catalyst retainer having a catalyst carried by a ceramics honeycomb carrier of a cylindrical shape and retained by a metal tubular member covering the outer part of the catalyst retainer through a retaining mat, comprising:
    a thickness of the retaining mat is set wherein the apparent density of the retaining mat during assembling becomes 0.25 g/cm$^3$ or more and less than 0.51 g/cm$^3$ and the outside diameter (D1) of the catalyst retainer is set according to an interference of the retaining mat when the retaining mat wound around the catalyst retainer passes through a press-in tool that presses-in the catalyst retainer to the metal tubular member and an interference of the retaining mat after being pressed into the metal tubular member within a range that does not exceed a predetermined single body allowable strength of the catalyst retainer;

said retaining mat being formed of a non-expandable inorganic fiber sheet;

a catalyst retainer pressing force for moving the catalyst retainer in an axial direction with respect to the metal tubular member that is obtained from a pressure difference of exhaust gas applied to the upstream side and downstream side of the catalyst retainer when the catalyst converter device for purifying exhaust gas is used inside an exhaust pipe or inside a muffler with an external force generated by vibration applied to the catalyst retainer; and the length (L2) along the longitudinal direction of the catalyst retainer in the retaining mat wound around the catalyst retainer is set longer than the winding diameter of the retaining mat around the catalyst retainer wherein a retaining force (R) larger relative to the catalyst retainer pressing force (F) can be secured:

$$F = G \cdot M + P \cdot S$$

wherein:

G: acceleration of vibration of the catalyst retainer during use

M: mass of the catalyst retainer

P: difference of the pressure of the exhaust gas applied to the upstream side and downstream side of the catalyst retainer during use S: pressure receiving area of the catalyst retainer.

2. The catalyst converter device for purifying exhaust gas according to claim 1, wherein the retaining force retaining the catalyst retainer during use is obtained from the coefficient of friction (μ) at a maximum use temperature of the retaining mat after being heated for a predetermined time at the maximum use temperature and being set by fatigue, the contact pressure of the retaining mat generated by interference of the retaining mat at the maximum use temperature, and a contact area between the metal tubular member or the catalyst retainer and the retaining mat.

3. The catalyst converter device for purifying exhaust gas according to claim 1, wherein length (L2) of the retaining mat is shorter than a length (L1) in the longitudinal direction of the catalyst retainer by a predetermined length (α).

4. The catalyst converter device for purifying exhaust gas according to claim 2, wherein length (L2) of the retaining mat is shorter than a length (L1) in the longitudinal direction of the catalyst retainer by a predetermined length (α).

5. A saddle-ride type vehicle, wherein the catalyst converter device for purifying exhaust gas according to claim 3 is welded to a downstream end of an exhaust pipe stored inside the muffler.

6. The saddle-ride type vehicle according to claim 5, wherein a catalyst retainer selected from among a plurality of kinds of the catalyst retainers with different length is incorporated into the muffler.

7. The saddle-ride type vehicle according to claim 6, wherein said catalyst retainer is retained to prevent shifting in an axial direction.

8. The saddle-ride type vehicle according to claim 5, wherein the ceramics honeycomb carrier is constructed of a porous structure having pores extending along an axial direction inside an outline of the cylindrical shape.

9. The saddle-ride type vehicle according to claim 6, wherein catalyst retainer includes a catalyst purifying exhaust gas component containing platinum, rhodium and palladium.

10. The saddle-ride type vehicle according to claim 5, wherein the ceramics honeycomb carrier is made of a material selected from the group consisting of cordierite, mullite, alumina, aluminates of alkaline earth metal, silicon carbide and silicon nitride.

11. A catalyst converter device for purifying exhaust gas comprising:

a catalyst retainer having a catalyst carried by a ceramics honeycomb carrier of a cylindrical shape;

a metal tubular member covering the outer part of the catalyst retainer through a retaining mat for retaining the catalyst retainer;

a thickness of the retaining mat being set wherein the apparent density of the retaining mat during assembling becomes 0.25 g/cm$^3$ or more and less than 0.51 g/cm$^3$ and the outside diameter (D1) of the catalyst retainer is set according to an interference of the retaining mat when the retaining mat wound around the catalyst retainer passes through a press-in tool that presses-in the catalyst retainer to the metal tubular member and an interference of the retaining mat after being pressed into the metal tubular member within a range that does not exceed a predetermined single body allowable strength of the catalyst retainer;

a catalyst retainer pressing force for moving the catalyst retainer in an axial direction with respect to the metal tubular member that is obtained from a pressure difference of exhaust gas applied to the upstream side and downstream side of the catalyst retainer when the catalyst converter device for purifying exhaust gas is used inside an exhaust pipe or inside a muffler with an external force generated by vibration being applied to the catalyst retainer; and a length (L2) along the longitudinal direction of the catalyst retainer in the retaining mat wound around the catalyst retainer is set longer than the winding diameter of the retaining mat around the catalyst retainer wherein a retaining force (R) larger relative to the catalyst retainer pressing force (F) can be secured:

$$F = G \cdot M + P \cdot S$$

wherein:

G: acceleration of vibration of the catalyst retainer during use

M: mass of the catalyst retainer

P: difference of the pressure of the exhaust gas applied to the upstream side and downstream side of the catalyst retainer during use S: pressure receiving area of the catalyst retainer.

12. The catalyst converter device for purifying exhaust gas according to claim 11, wherein the retaining force retaining the catalyst retainer during use is obtained from the coefficient of friction (μ) at a maximum use temperature of the retaining mat after being heated for a predetermined time at the maximum use temperature and being set by fatigue, the contact pressure of the retaining mat generated by interference of the retaining mat at the maximum use temperature, and a contact area between the metal tubular member or the catalyst retainer and the retaining mat.

13. The catalyst converter device for purifying exhaust gas according to claim 11, wherein length (L2) of the retaining mat is shorter than a length (L1) in the longitudinal direction of the catalyst retainer by a predetermined length (α).

14. The catalyst converter device for purifying exhaust gas according to claim 12, wherein length (L2) of the retaining mat is shorter than a length (L1) in the longitudinal direction of the catalyst retainer by a predetermined length ($\alpha$).

15. A saddle-ride type vehicle, wherein the catalyst converter device for purifying exhaust gas according to claim 13 is welded to a downstream end of an exhaust pipe stored inside the muffler.

16. The saddle-ride type vehicle according to claim 15, wherein a catalyst retainer selected from among a plurality of kinds of the catalyst retainers with different length is incorporated into the muffler.

17. The saddle-ride type vehicle according to claim 16, wherein said catalyst retainer is retained to prevent shifting in an axial direction.

18. The saddle-ride type vehicle according to claim 15, wherein the ceramics honeycomb carrier is constructed of a porous structure having pores extending along an axial direction inside an outline of the cylindrical shape.

19. The saddle-ride type vehicle according to claim 16, wherein catalyst retainer includes a catalyst purifying exhaust gas component containing platinum, rhodium and palladium.

20. The saddle-ride type vehicle according to claim 15, wherein the ceramics honeycomb carrier is made of a material selected from the group consisting of cordierite, mullite, alumina, aluminates of alkaline earth metal, silicon carbide and silicon nitride.

* * * * *